United States Patent
Weitzman et al.

(10) Patent No.: US 11,202,261 B2
(45) Date of Patent: Dec. 14, 2021

(54) APPARATUS AND METHOD FOR COMMUNICATIONS

(71) Applicant: HUAWEI TECHNOLOGIES CO., LTD., Shenzhen (CN)

(72) Inventors: Avi Weitzman, Hod Hasharon (IL); Genadiy Tsodik, Hod Hasharon (IL); Shimon Shilo, Hod Hasharon (IL); Doron Ezri, Hod Hasharon (IL); Ohad Klausner, Hod Hasharon (IL); Ming Gan, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 174 days.

(21) Appl. No.: 16/561,301

(22) Filed: Sep. 5, 2019

(65) Prior Publication Data
US 2019/0394728 A1 Dec. 26, 2019

Related U.S. Application Data

(63) Continuation of application No. PCT/EP2017/055223, filed on Mar. 6, 2017.

(51) Int. Cl.
*H04W 52/02* (2009.01)
*H04W 76/27* (2018.01)
*H04W 74/08* (2009.01)

(52) U.S. Cl.
CPC ... *H04W 52/0229* (2013.01); *H04W 52/0216* (2013.01); *H04W 74/0816* (2013.01); *H04W 76/27* (2018.02)

(58) Field of Classification Search
CPC ......... H04W 52/0206; H04W 52/0216; H04W 52/0229; H04W 52/0232; H04W 74/0816; H04W 76/10; H04W 76/27; H04W 84/12; H04W 88/08; Y02D 30/70
See application file for complete search history.

(56) References Cited

U.S. PATENT DOCUMENTS

| | | | |
|---|---|---|---|
| 8,346,171 B1* | 1/2013 | Mack | H04W 4/00 455/63.1 |
| 10,009,949 B2* | 6/2018 | Kim | H04W 8/005 |
| 10,203,748 B2* | 2/2019 | Turon | H04L 12/2816 |
| 2011/0182222 A1 | 7/2011 | Patel et al. | |
| 2014/0247780 A1 | 9/2014 | Jafarian et al. | |
| 2016/0183187 A1 | 6/2016 | Park | |
| 2018/0110000 A1* | 4/2018 | Shellhammer | H04W 52/0206 |
| 2020/0084720 A1* | 3/2020 | Marin | H04W 52/0206 |

FOREIGN PATENT DOCUMENTS

| | | |
|---|---|---|
| CN | 101118655 A | 2/2008 |
| CN | 101197831 A | 6/2008 |
| CN | 102148641 A | 8/2011 |

* cited by examiner

*Primary Examiner* — Thomas R Cairns
(74) *Attorney, Agent, or Firm* — Stein IP, LLC (57) ABSTRACT

An apparatus and method for communications, wherein a communication device comprises a processor configured to perform during a time period a determination if a transmission medium is free for communication, and a transmitter configured to transmit a wake-up signal on the transmission medium if the transmission medium is free.

19 Claims, 11 Drawing Sheets

APPARATUS AND METHOD FOR COMMUNICATIONS

CROSS-REFERENCE TO RELATED APPLICATIONS

This application is a continuation of International Application No. PCT/EP2017/055223, filed on Mar. 6, 2017, the disclosure of which is hereby incorporated by reference in its entirety.

TECHNICAL FIELD

Aspects of the present invention relate to an apparatus, a method for communications and a computer program product.

BACKGROUND

IEEE 802.11 based Wireless Local Area Networks (WLANs) became popular at an unprecedented rate. Besides traditional Internet connectivity for PC and laptop devices, the majority of WLAN network devices are mobile devices such as smart phones and so on. In the near future, the number of WLAN devices will be dramatically increased due to the emerging Internet of Things (IoT) devices market. However, most of the IEEE802.11 power save mechanisms are not optimized for small size devices with limited battery power (e.g., IoT, mobile devices, etc.) and restrict power consumption requirements.

Figure 1A:
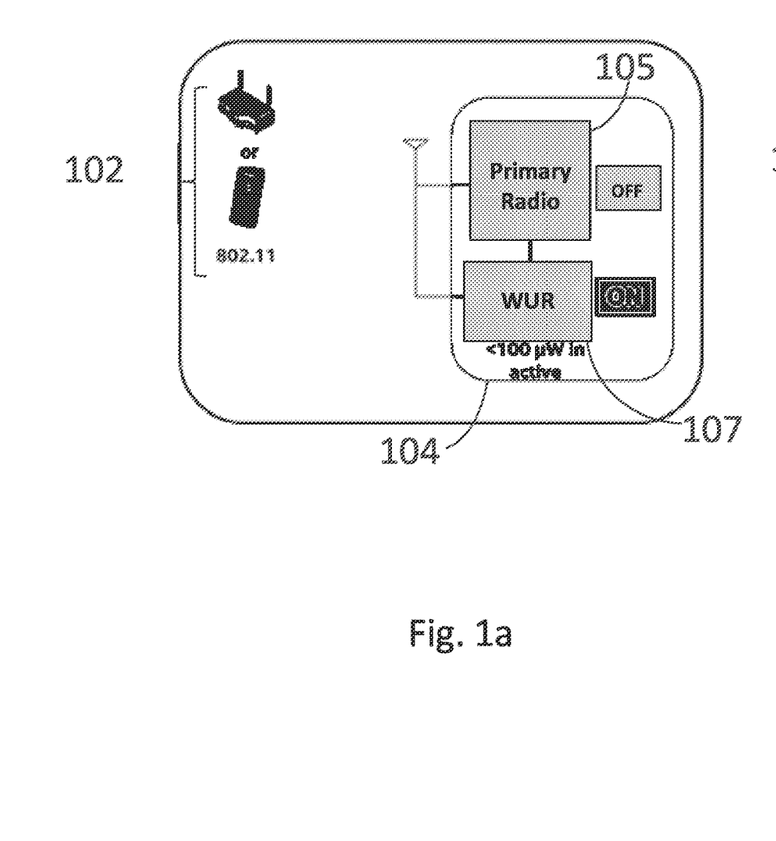
FIGS. 1*a* and 1*b* show a communication system adopting a WUR concept.
Figure 1B:
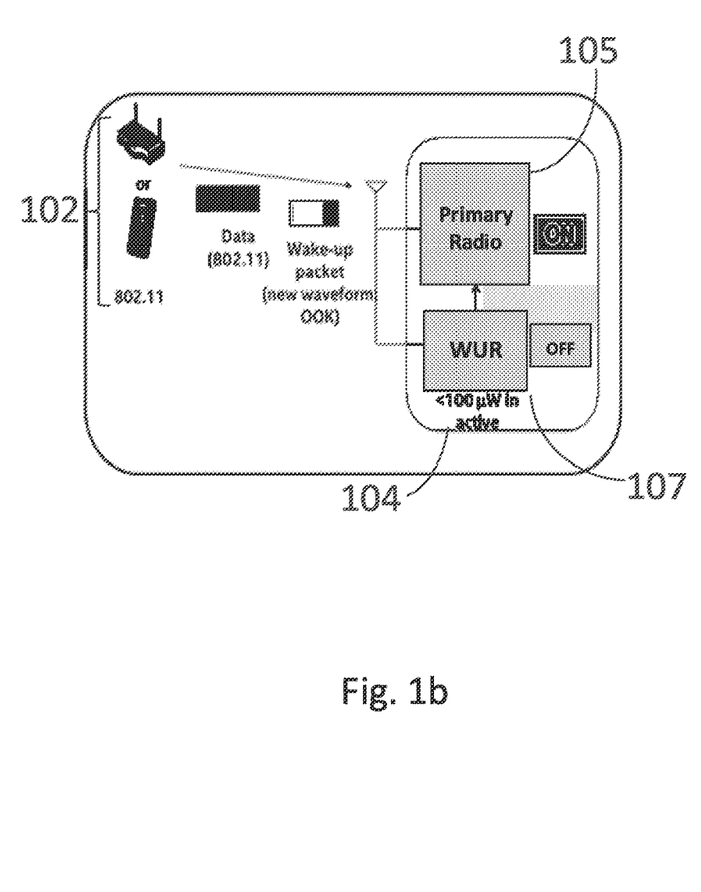

As shown in FIGS. 1a and 1b, a communication system 100 adopts a Wake-Up Radio (WUR) concept in order to reduce power consumption of a mobile device 104. The communication system 100 includes an access point (AP) 102 and the mobile device 104. The mobile device 104 includes a primary radio 105 and a low power consumption receiver shown as a WUR 107. According to the WUR concept, the primary radio 105 is used for data exchange including transmission and reception, and can switch between statuses "on" and "of" based on a trigger from the WUR 107. The WUR 107 is used to wake up the primary radio 105 but not used for data exchange. In FIG. 1a, there is no data exchange between the AP 102 and the mobile device 104. The primary radio 105 is "off" and the WUR 107 is "on". In FIG. 1b, there is data to be exchanged between the AP 102 and the mobile device 104. A wake-up signal is transmitted from the AP 102 to the mobile device 104. Upon receiving the wake-up signal, the WUR 107 triggers the primary radio 105. The primary radio 105 is turned "on" and is ready for data exchange. Correspondingly, the WUR 107 turns to be "of". Because of an on/off duty-cycle of the WUR 107, additional lower power consumption is achieved.

Figure 2:
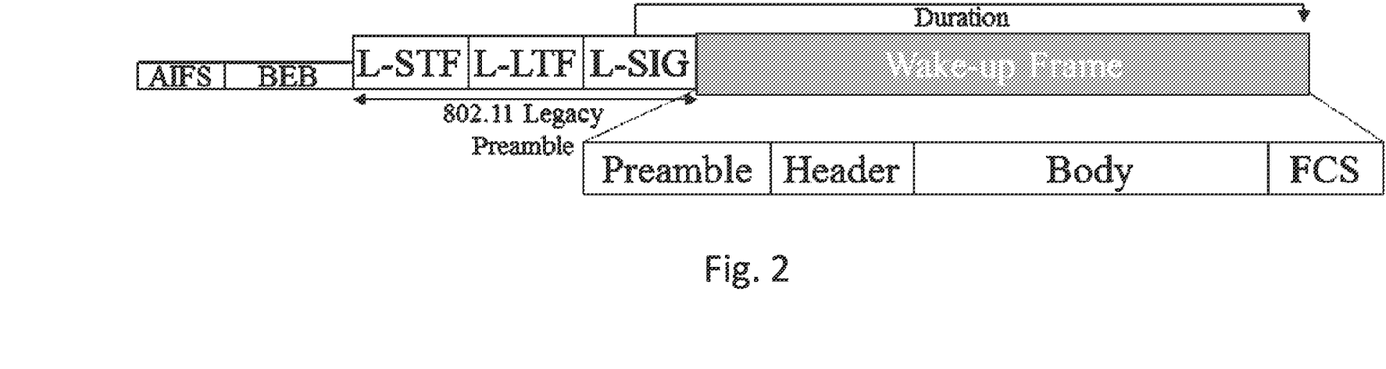
FIG. 2 shows a wake-up signal preceded by a legacy preamble.
Figure 3:
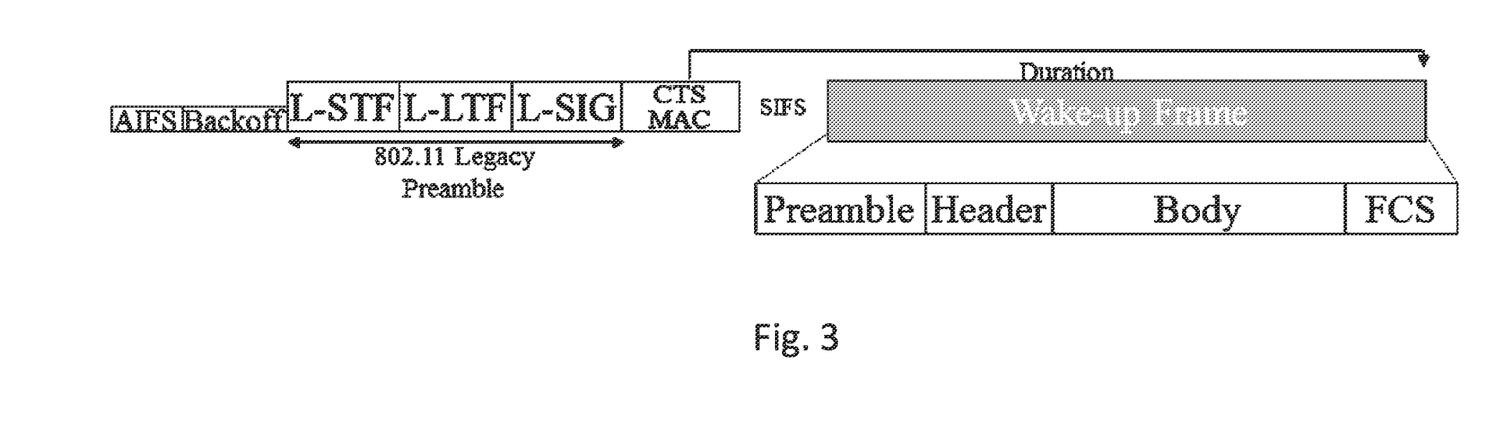
FIG. 3 shows a wake-up signal preceded by a CTS frame.

In the state of the art, a wake-up signal may be preceded by an 802.11 legacy preamble or a clear to send (CTS) frame. A wake-up signal may be transmitted using an 802.11 CSMA/CA access scheme. FIG. 2 shows a wake-up signal preceded by the 802.11 legacy preamble. The wake-up signal (shown as a wake-up Frame in FIG. 2) comprises a preamble, a header, a body and a frame check sequence (FCS). The legacy preamble is a preamble according to the 802.11 protocol in the state of the art and includes a Non-high throughput (HT) Short Training field (L-STF), a Non-HT Long Training field (L-LTF) and a Non-HT SIGNAL field (L-SIG). The legacy preamble is transmitted after an arbitration interframe space (AIFS) and a backoff process using a Binary Exponential Backoff (BEB) algorithm. FIG. 3 shows a wake-up signal preceded by a CTS frame (shown as a CTS MAC field in FIG. 3) and a possible short interframe space, SIFS.

In the state of the art, collisions may occur among multiple transmissions of wake-up signals or between transmission of wake-up signals and WLAN signals from different mobile devices. All the mobile devices related to the collisions may have to perform retransmissions. Therefore, communication efficiency is decreased and communication delay is increased when a collision occurs.

SUMMARY

An object of the present invention is to provide an apparatus and a method for communications, especially for a Wi-Fi communication, so as to increase the communication efficiency and/or decrease the communication delay.

The above-mentioned object of the present invention is achieved by the solution provided in the independent claims. Further, implementations are defined in the dependent claims. Therefore, the communication efficiency is increased and the communication delay is decrease due to lower possibility of collisions.

A first aspect of the present invention provides a communication device, comprising:
  a processor configured to perform during a time period a determination if a transmission medium is free for communication; and
  a transmitter configured to transmit a signal, for example, a wake-up signal, on the transmission medium if the transmission medium is free.

The communication device can be in particular for a Wi-Fi communication. The communication device can be any WLAN device, such as an access point (AP) or a terminal. The term "medium" can refer to a channel or any communication resource that can be configured or scheduled for the transmission. The term "free" is a status of the transmission medium and can refer to a situation where no collision, traffic or transmission is on the transmission medium. Compared with the state of the art, a time period is configured so that the communication device can determine the status of a transmission medium, for example free or not, and further transmit a wake-up signal on the transmission medium based on the determined status of the transmission medium. Therefore, possible collisions during the transmission of the wake-up signal can be avoided without increasing possible retransmissions that the communication device has to perform due to collisions. Further, the wake up signal can be communicated reliably to the receiving device. This could also minimize transmission inefficiency and transmission delay when the communication device sleeps.

In a first implementation form of the communication device according to the first aspect, the communication device further comprises:
  a detector configured to detect if the transmission medium is free for communication during the time period; and wherein the determination is based on a result of the detector whether the transmission medium is free or not.

A detection performed by the communication device can provide a timely and accurate basis for the determination of the communication device. The detection can either be performed by listening to the transmission medium if there are any signals transmitted from other devices. The detection can also comprise to send a test-signal and to determine whether the test-signal collides with a signal from another device. The communication device does not have to communicate with another device to perform the determination, and thereby decreasing necessary overheads before transmitting the wake-up signal. Any delay of the determination due to the possible communication with another device on the basis for the determination is also decreased.

In a second implementation form of the communication device according to the first aspect, the communication device further comprises:

a receiver configured to receive a notification from another device, wherein the notification can comprise information on whether the transmission medium is free or not or information of a certain resource allocation, in particular for other devices of the network.

The determination if the transmission medium is free or not is based on the notification of the receiver.

The communication device can receive information and accordingly perform the determination. Therefore, no detection performed by the communication is needed. The processing complexity in the communication device is reduced.

In a third implementation form of the communication device according to the first aspect and any previous implementation form of the first aspect, the processor is further configured to switch the communication device to an idle mode if the transmission medium is not free.

The communication device returns to the idle mode and accordingly a planned transmission of a wake-up signal on the transmission medium is aborted. Thereby, advantageously collisions between a transmission of the communication device and other transmissions (from other devices) on the transmission medium are avoided. Furthermore, a power consumption of the communication device can be reduced, because in idle mode power, consuming parts of the communication device can be deactivated.

In a fourth implementation form of the communication device according to the first aspect and any previous Implementation form of the first aspect, the transmitter is further configured to transmit a preamble. The time period starts after the preamble is transmitted by the transmitter.

The time period is configured after a transmission of a preamble. The time period can be started directly after the preamble is transmitted completely. This facilitates the communication device to determine timely and accurately the status of the transmission medium. In a scenario where a communication uses 802.11 standards, the preamble can contain a field that informs other devices what is the time duration of the entire transmission including the preamble and any transmitted data. This information is used to refrain other devices from transmitting on the transmission medium. The time period configured after a transmission of the preamble can give the communication device sufficient time to perform the determination while other devices cannot trigger a new transmission on the transmission medium during this time period.

In a fifth implementation form of the communication device according to the first aspect and any previous implementation form of the first aspect, a length of the time period is predefined in the communication device, or decided by the processor.

The time period is defined with a certain length. A region of the length of the time period can be from 12 to 25 μsec. The communication device can obtain the predefined length of the time period. For example, the communication device reads the length of the time period from a memory or receives the time period from other devices. The internal processing procedure of the communication device is comparably simple. Alternatively, the communication device can decide a length of the time period by itself. In this way, the communication device can decide when and how to determine the length of the time period based on practical requirements.

In a sixth implementation form of the communication device according to the first aspect and any previous implementation form of the first aspect, the length of the time period is decided by the processor based on a Tx-Rx switching time, a time for the detector to perform the detection, and/or an Rx-Tx switching time. The Tx-Rx switching time (namely a Tx-Rx transition time) can refer to turn-round time for a switch from a transmission mode (Tx) to a receiving mode (Rx). The Rx-Tx switching time (namely a Rx-Tx transition time) can refer to turn-round time for a switch from a receiving status to a transmission status.

Several practical parameters such as a Tx-Rx switching time, a time for the detector to perform the detection, and an Rx-Tx switching time are taken into account by the communication device when deciding the length of the time period. In this way, the communication device can decide dynamically the length of the time period based on practical requirements. For example, the length of time for the detector to perform the detection can be based on a predefined urgency to wake up a certain device. If the time to perform the detection is short a wake-up signal will be sent with a higher possibility because the time to detect that the transmission medium is occupied by another device is shorter. Thereby, the possibility of collisions can be expectedly lower and at the same time a device can be woken up with high probability.

In a seventh implementation form of the communication device according to one of the sixth and seventh implementation forms of the first aspect, the processor is further configured to randomly select how many time slots are included in the time period. The length of the time period is decided by the processor based on how many time slots are selected.

By randomly selecting how many time slots are used for a time period, the communication device increases its capabilities to detect collisions with another device, because the possibility that time periods of several devices start and end at the same time (which would mean that these devices cannot detect any collisions from each other) is reduced.

In an eighth implementation form of the communication device according to the first aspect and any previous implementation form of the first aspect, the communication device is an access point, AP.

For example, the AP can be a Wi-Fi AP, which is an access point capable to provide Wi-Fi access, for example, a home gateway. The AP may be a soft-AP, which is capable to support other device's Wi-Fi access, for example, a smart phone configured with a software function of providing Wi-Fi access. The AP may be a WLAN device, which is connected to other device using an Ad-hoc protocol, for example, two lap-tops communicating one with the other.

A second aspect of the present invention provides a communication method, comprising:

performing, by a communication device, during a time period a determination if a transmission medium is free for communication; and transmitting, by the communication device, a wake-up signal on the transmission medium if it is free.

Compared with the state of the art, a time period is configured so that the communication device can determine the status of a transmission medium, for example, free or not, and further transmit a wake-up signal on the transmission medium based on the determined status of the transmission medium. Therefore, possible collisions during the transmission of the wake-up signal can be avoided without increasing possible retransmissions that the communication device has to perform due to collisions. This also minimizes the transmission inefficiency and the transmission delay when the communication device sleeps.

In a first implementation form of the base station according to the second aspect, the method further comprises:
  detecting, by the communication device, if the transmission medium is free for communication during the time period;
  and wherein the determination is based on a detecting result.

A detection performed by the communication device can provide a timely and accurate basis for the determination of the communication device. The communication device does not have to communicate with another device to perform the determination and thereof decreasing necessary overheads before transmitting the wake-up signal. Any delay of the determination due to the possible communication with another device on the basis for the determination is also decreased.

In a second implementation form of the base station according to the first implementation form of the second aspect, the method further comprises:
  switching the communication device to ide mode during a transmission process if the transmission medium is not free.

The communication device, which is in Tx mode and ready to a further transmission, returns to the idle mode so that collisions between a transmission of the communication device and other transmissions on the transmission medium are avoided.

In a third implementation form of the base station according to any previous implementation form of the second aspect and according to the second aspect, the method further comprises:
  transmitting, by the communication device, a preamble;
  and wherein the time period starts after the preamble is transmitted.

The time period is configured after a transmission of a preamble. This facilitates the communication device to determine timely and accurately the status of the transmission medium. In a scenario where a communication uses 802.11 standards, the preamble contains a field that informs other devices what is the time duration of the entire transmission, including the preamble and any transmitted data. This information is used to prevent other devices from transmitting on the transmission medium. The time period configured after a transmission of the preamble gives the communication device sufficient time to perform the determination while other devices cannot trigger a new transmission on the transmission medium during this time period.

In a fourth implementation form of the base station according to any previous implementation form of the second aspect and according to the second aspect, the method further comprises:
  obtaining, by the communication device, a predefined length of the time period, or
  deciding, by the communication device, a length of the time period.

The time period is defined with a certain length. The communication device can obtain the predefined length of the time period. For example, the communication device reads the length of the time period from its memory or other devices. The internal processing procedure of the communication device is comparably simple. Alternatively, the communication device can decide a length of the time period by itself. In this way, the communication device can decide when and how to determine the length of the time period based on practical requirements.

A third aspect of the present invention provides a computer program comprising a program code for performing, when running on a computer, the method according to the second aspect of the present invention.

BRIEF DESCRIPTION OF THE DRAWINGS

The above aspects and implementation forms of the present invention will be explained in the following description of specific embodiments in relation to the enclosed drawings, in which.

DETAILED DESCRIPTION OF THE EMBODIMENTS

Figure 4:
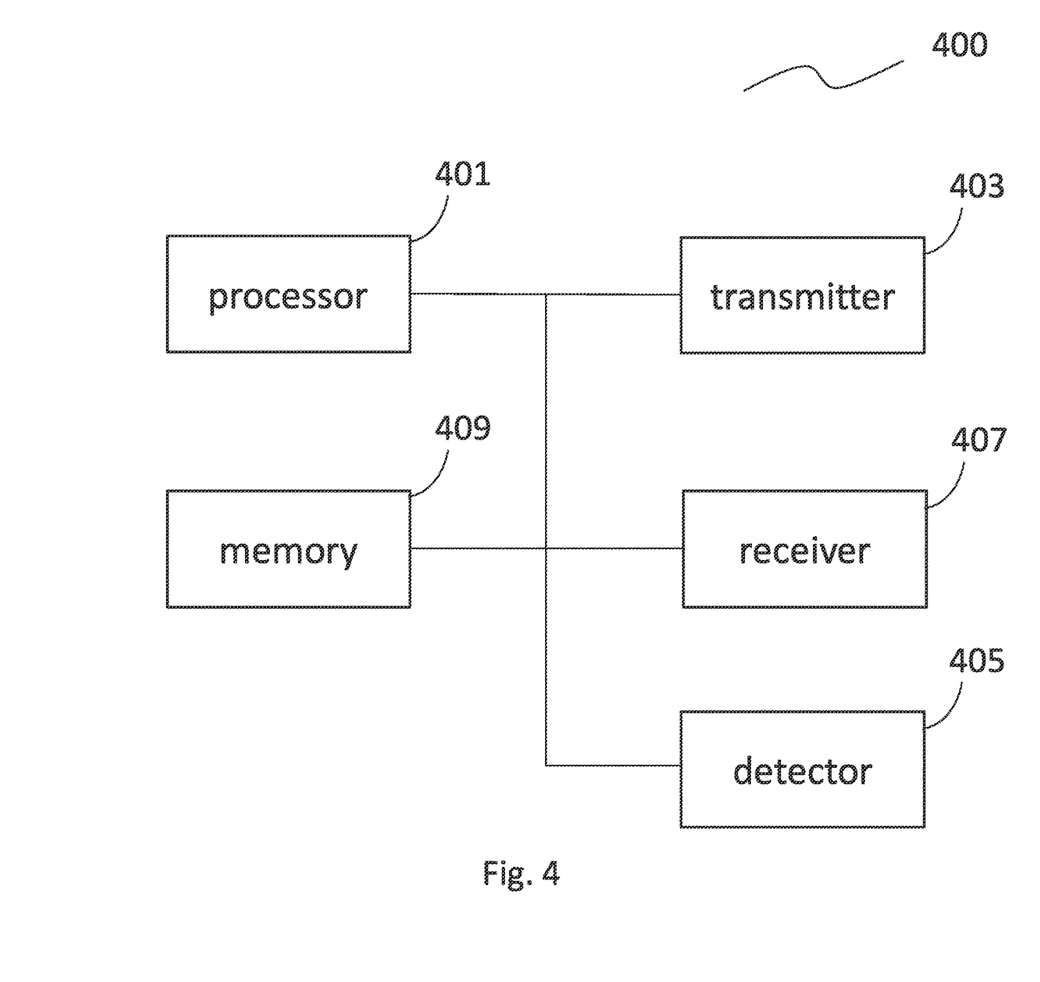
FIG. 4 shows a block diagram of a communication device according to an embodiment of the present invention.

FIG. 4 shows a communication device 400 according to an embodiment of the present invention. The communication device 400 may be an access point (AP), e.g., for Wi-Fi communications. For example, the communication device 400 is a Wi-F AP such as a home gateway. The communication device 400 may be a device Integrated with a function of providing Wi-Fi access, namely a soft-AP, in particular comprised by a mobile communication device. The communication device 400 may be a WLAN device capable of working in an independent basic service set (IBSS) mode with other devices, for example another WLAN IBSS device. In an example, the communication device 400 is a lap-top communicating with another lap-top using Ad-hoc protocol.

The communication device 400 can based on an 802.11 protocol communicate with other devices, for example, small size devices with limited battery power. The communication may be any transmission of data or signal. For example, the communication device 400 can be used as the AP 102 shown in FIG. 1*a* and FIG. 1*b*, and transmit a wake-up signal (also namely a wake-up packet or a wake-up frame) and subsequent data to the mobile device 104.

In an embodiment of the present invention, the communication device 400 performs an analysis or process on the transmission medium within the time period to check if the transmission medium is free or not and decide if a signal transmission should be continued or aborted. For example, as shown in FIG. 4, the communication device 400 may include a processor 401. The processor 401 may be configured to perform during a time period a determination if a transmission medium is free for communication. Additionally or alternatively, the processor 401 may be further configured to switch the communication device 400 to an ide mode if the transmission medium is not free.

The communication device 400 may also include a transmitter 403. The transmitter 403 is configured to transmit a signal, for example, a wake-up signal, on the transmission medium if the transmission medium is free as determined by the processor 401.

As shown in FIG. 4, the communication device 400 may further include a detector 405 and/or a receiver 407. The communication device 400 may further include a memory 409, which provides access to one or more elements in the communication device 400. Optionally, a data bus (not shown in FIG. 4) may connect all the elements, including the processor 401, the transmitter 403, the detector 405, the receiver 407 and the memory 409, in the communication device 400.

According to an embodiment of the invention, the detector 405 is configured to detect if the transmission medium is free for communication during the time period. The processor 401 may perform the determination based on an output of the detector 405. The output of the detector 405 indicates to the processor 401 that the transmission medium is free or not free for communication during the time period. The output of the detector 405 is not limited to a single format so long as the processor 401 can recognize the output.

Figure 5:
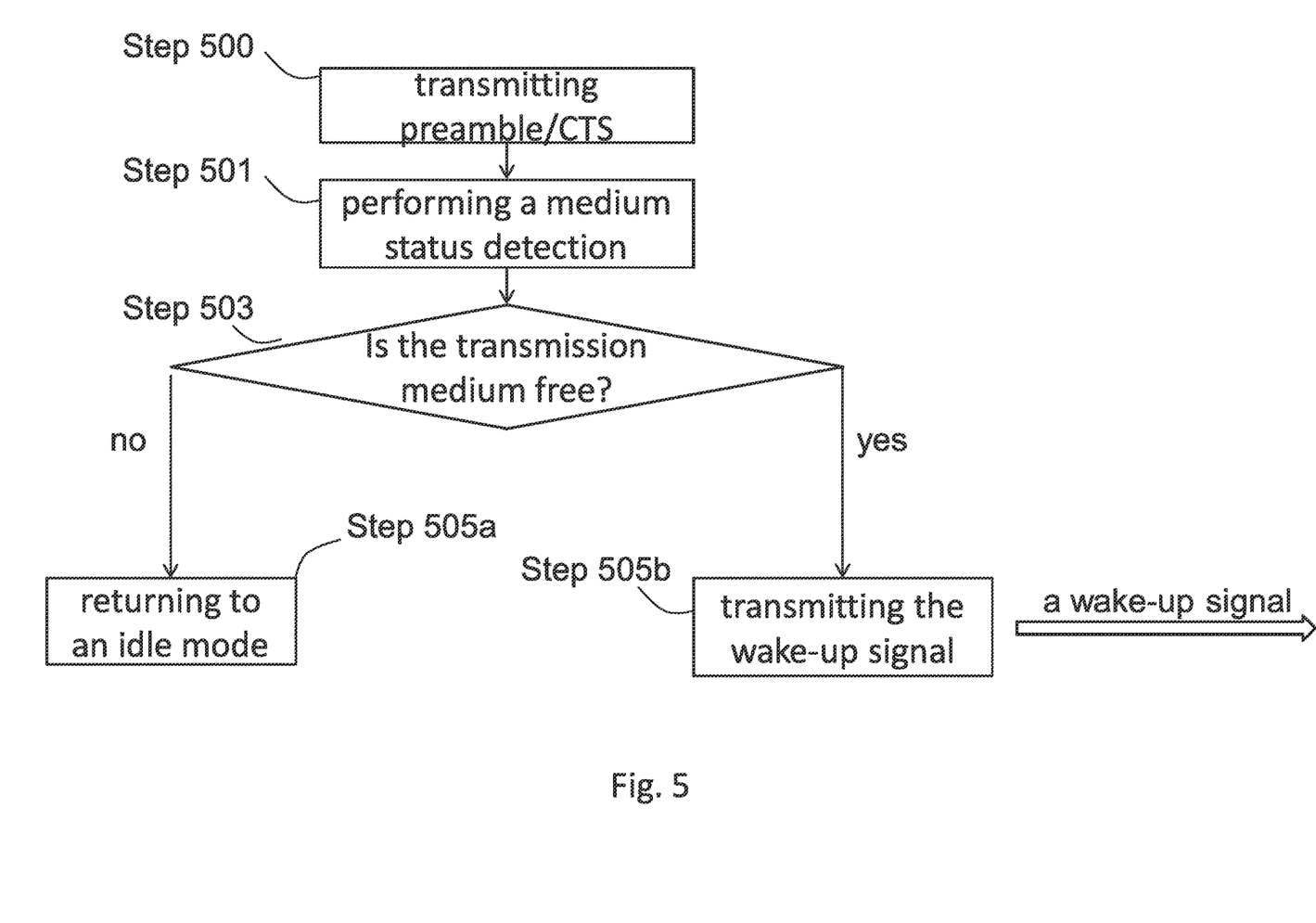
FIGS. 5 and 6 show block diagrams of alternative processing methods of a communication device according to an embodiment of the present invention.

As shown in FIG. 5, in a processing method of the communication device 400 according to an embodiment of the present invention, a medium status detection, for example, a Clear Channel Assessment (CCA) detection, is performed by the detector 405 in Step 501. Based on the output of the medium status detection, the processor 401 can determine whether (or not) the transmission medium is free for communication during the time period in Step 503. The CCA detection is an example in the embodiment of the present invention. Any detection that results in an output of checking the medium status, for example, checking whether the transmission medium is free, can substitute or complement the CCA detection in the embodiment of the present invention.

If during the time period the transmission medium is not free, for example, occupied by another transmission, the processor 401 performs Step 505a, and the communication device 400 returns to an idle mode. Although the communication device 400 is still in a transmission mode and ready to perform the expected transmission, the transmission will be stopped and the communication device 400 is in the idle mode instead of the transmission mode. The transmitter 403 does not perform any transmission on the transmission medium so that a possible collision between a transmission originated by the communication device 400 and a transmission originated by another device can be avoided.

Alternatively, if during the time period the transmission medium is free, for example the transmission medium is not occupied by another transmission, the processor 401 performs Step 505b, the transmitter 403 transmits a wake-up signal. The wake-up signal is the only transmission on the transmission medium. No other device starts a new transmission on the transmission medium before the communication device 400 finishes transmitting the wake-up signal. Therefore, the possibility of collisions due to the transmission of the wake-up signal is decreased.

Figure 6:
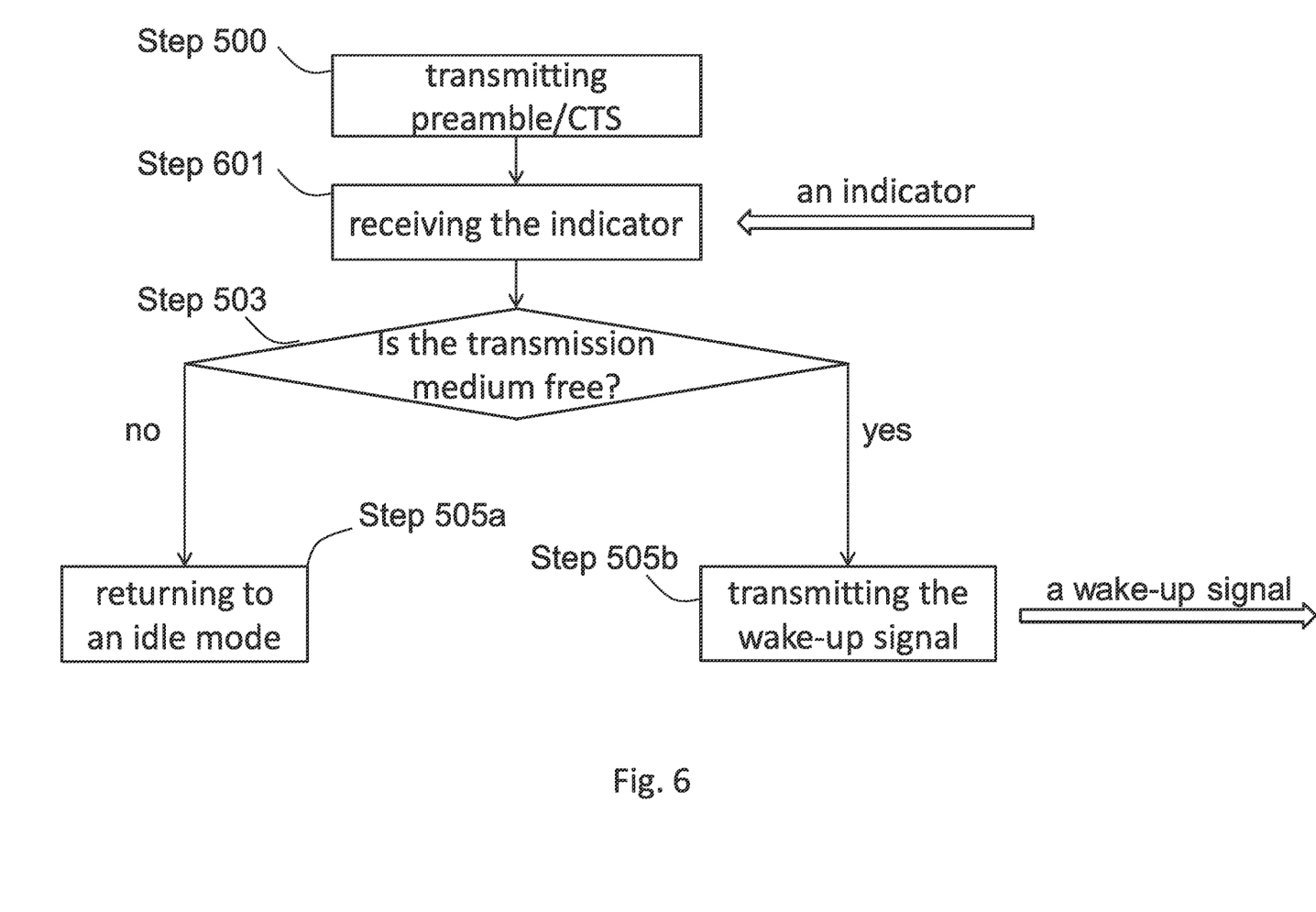

According to an embodiment of the invention, the receiver 407 in the communication device 400 is configured to receive information from another device. The information indicates that the transmission medium is free or not for communication during the time period. The processor 401 may perform the determination based on the information, for example, shown as an indicator in FIG. 6, and does not have to by itself perform the detection on the transmission medium as shown in FIG. 5. Steps 503, 505a and 505b in FIG. 6 are the same as or similar to those in FIG. 5.

Figure 7:
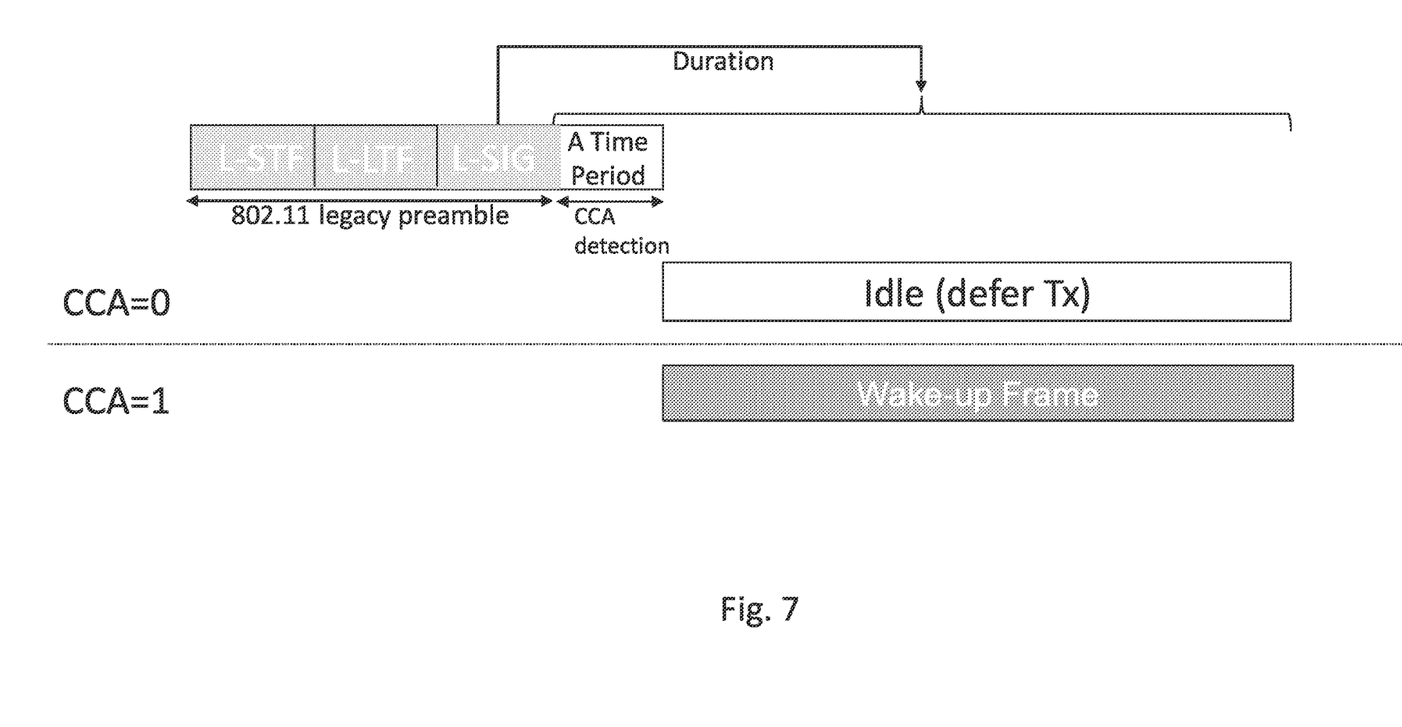
FIG. 7 shows a time period between legacy preamble and a wake-up signal according to an embodiment of the present invention.
Figure 8:
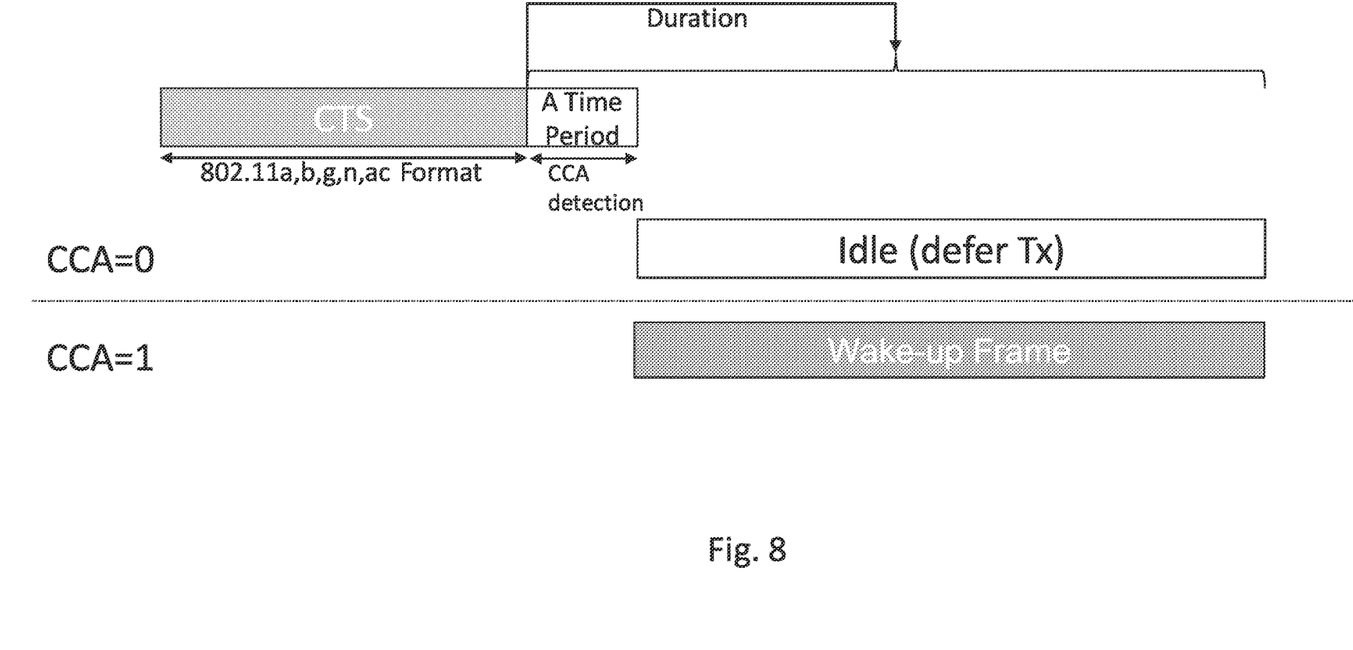
FIG. 8 shows a time period between a CTS frame and a wake-up signal according to another embodiment of the present invention.

According to an embodiment of the present invention, before checking the medium status, the transmitter 403 may transmit a preamble such as an 802.11 legacy preamble and/or a CTS frame, in Step 500. A wake-up signal is expected to be transmitted after the preamble. In other words, a transmission of the wake-up signal can start with a transmission of a wake-up preamble, for example, an 802.11 legacy preamble as shown in FIG. 7 or a CTS frame as shown in FIG. 8. It should be noted that the term "legacy" is used to name the preamble and cannot be considered as a technical limitation of the preamble. The legacy preamble in the embodiment of the present invention may be a preamble used the same as or similar to that in the state of the art. For example, 802.11 legacy preamble may be a preamble in 802.11 protocol, which is the same as or similar to a preamble as shown in FIG. 2.

As shown in FIG. 7, the transmission of the wake-up signal is determined by the processor 401 based on a result of a CCA detection. Assuming the output "0" of the CCA detection indicates that there is already a transmission on the transmission medium, the processor 401 stops the transmitter 403 from performing the planned transmission of the wake-up signal. The transmission of the wake-up signal may be deferred, in particular until the processor 401 has determined that the transmission medium is free for a new transmission from the communication device 400, e.g. by applying a further timer period to analyze the status of the transmission medium. Additionally or alternatively, the output "1" of the CCA detection indicates that the transmission medium is free. The processor 401 controls the transmitter 403 to perform the planned transmission of the wake-up signal.

As shown in FIG. 7, the time period (also called a silent period because the communication device 400 keeps silent during this period) starts after the 802.11 legacy preamble, in particular directly after the preamble. The time period lasts for a while, which is called a length of the time period. An output "0" can stop the detector 405 from performing further medium status detections in the time period. For example, the processor 401 may perform the CCA detection from the beginning of the time period and continuously perform the CCA detection until obtaining an output "0" at a certain time point in the time period or obtaining no output during the entire of the time period. Then the processor 401 may, before the time period comes to the end, control the communication device 400 to return the communication device 400 to the idle mode. Alternatively, the detector 405 does not perform further CCA detections if an output "1" is obtained at the end of the time period. For example, the processor 401 may perform continuously the CCA detection during the entire time period. If at the end of the time period, the transmission medium is still free, the processor 401 may immediately control the transmitter 403 to transmit the wake-up signal. The duration as shown in FIG. 7 indicates how long other devices are not allowed to trigger a new transmission on the transmission medium. Compared with this duration, the shorter that the time period lasts, the higher a possibility of a transmission of the wake-up signal.

Similar to FIG. 7, FIG. 8 shows different determinations on a wake-up signal transmission. The difference between the embodiments depicted in FIG. 7 and FIG. 8 is that the time period in the embodiment in FIG. 8 starts directly after a transmission of a CTS frame. The CTS frame may include a CTS MAC field filled with an address of its transmitting node, that is, the address of the communication device 400 according to an embodiment of the present invention. Formats 802.11a/b/g/n/ac are shown as examples of the CTS frame. Information, such as a preamble, can be transmitted before the CTS frame. This is the same as or similar to FIG. 3.

The length of the time period may be predefined in the communication device 400 or decided by the processor 401. As shown in FIGS. 7 and 8, the time period is between the wake-up frame and one of the legacy preamble transmission and the CTS transmission. The time period enables the transmitter 403 to execute the CCA procedure (e.g., the CCA detection) and enables the processor 401 to determine if the transmission medium is indeed free.

According to an embodiment of the present invention, the length of the time period before the (planned) transmission of the wake-up signal may be derived based on the following:

A capability of the communication device, in particular:
  a switching time between Tx (e.g., transmitting preamble or CTS) to Rx (e.g., performing a medium status detection) and in particular back to Tx (e.g., transmitting a wake-up signal); and/or
  a minimal time required by a switch from Tx to Rx and/or a switch from Rx to Tx, e.g., shorter than SIFS.

A characteristic of the medium status detection is, in particular, a minimal time required to measure a CCA, e.g., less than a slot (i.e., 9 μsec).

A characteristic of a carrier-sense multiple access (CSMA)-protocol, in particular a time duration for a WLAN device to access a transmission medium after the transmission medium is "idle", e.g., at least point coordination function (PCF) interframe space (PIFS)=19 μsec when the device works at 2.4 GHz (for short namely @2.4 GHz) or at least PIFS=25 μsec when the device works at 5 GHz (for short namely @5 GHz). This consideration may refer to a duration between a first time point when the processor 401 starts to control the transmitter 403 to transmit the wake-up signal and a second time point when the wake-up signal is transmitted on the transmission medium in an embodiment of the present invention.

A collision avoidance strategy (e.g., a collision between WURs, and/or a collision between WUR and a WLAN radio) is, in particular
  different time periods that are set for different communication devices in order to prevent a collision between different communication devices.

Figure 9:
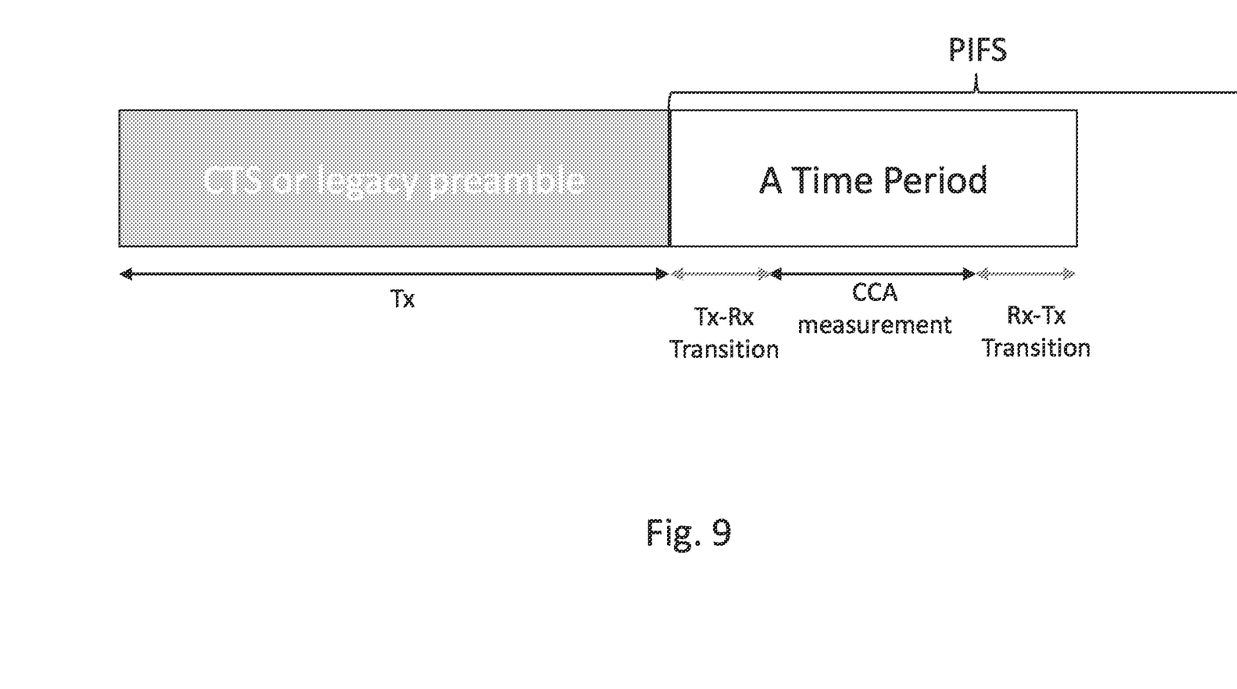
FIG. 9 shows a structure of a time period according to an embodiment of the present invention.

As shown in FIG. 9, a time period after the CTS frame or the legacy preamble has a length shorter than PIFS. The time period includes a Tx-Rx Transition time, a time duration for a CCA measurement, and an Rx-Tx Transition time.

According to an embodiment of the present invention, a time period can be determined within a region. Assume for practical RF solutions that Tx-Rx turn-around time is less than 4 μsec and a CCA measurement needs 4 μsec. The length of the time period can be obtained as follows.

@2.4 GHz:

A lower limit is: 2×RF switch+a time duration for a CCA measurement=2×4+4=12 μsec. An upper limit is: PIFS=19 μsec.

Therefore, a length of the time period is [12, 19] μsec.

@5 GHz: A lower limit is: 2×RF switch+a time duration for a CCA measurement=2×4+4=12 μsec. An upper limit is: PIFS=25 μsec.

Therefore, a length of the time period is [12, 25] μsec.

The upper limit of the length of the time period is set according to the minimal "free" medium time that enables another device to start its transmission on the medium. In this way, the communication device does not have to wait for too long time to have a final determination on the status of the transmission medium. Therefore, the transmission efficiency can be increased and the power consumption of the communication device can be decreased.

Figure 10:
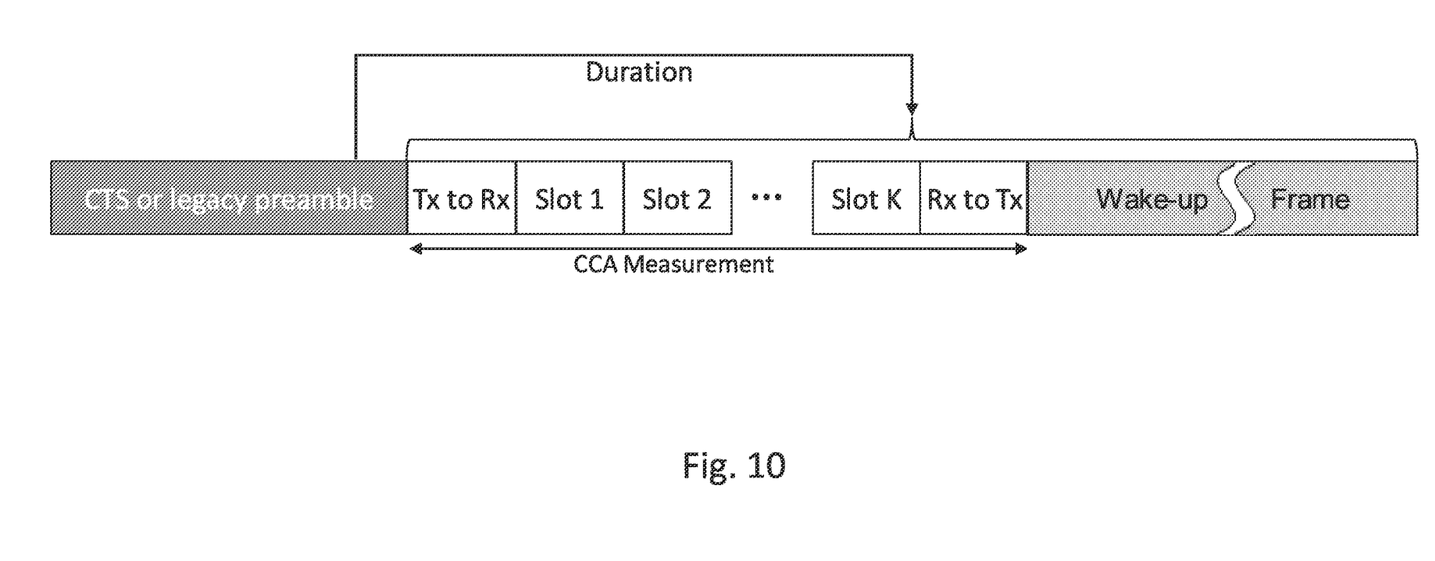
FIG. 10 shows a structure of a time period according to another embodiment of the present invention.

To prevent the communication device 400 from collisions with other communication devices transmitting data or signals on the transmission medium, each communication device 400 may use random duration of the time period. As shown in FIG. 10, a time period after CTS or legacy preamble includes Tx-Rx transition time, a time duration for a CCA measurement, and/or the Rx-Tx transition time. The time duration for the CCA measurement includes K time slots. K can be randomly selected by each communication device.

According to an embodiment of the present invention, the processor 401 is further configured to randomly select an integer. The selected integer indicates how many time slots are included in the time period. Accordingly, the processor 401 decides the length of the time period. Assuming that a time slot is 4 μsec, a set of K can be obtained as follows:

@2.4 GHz: {0, 1, 2}

For example, the processor 401 selects K=2. There are two time slots included in the time period. Therefore, the time period is 4+2×4+4=16 μsec.

@5 GHz: {0, 1, 2, 3, 4}

For example, the processor 401 selects K=4. There are four time slots included in the time period. Therefore, the time period is 4+4×4+4=24 μsec.

Figure 11:
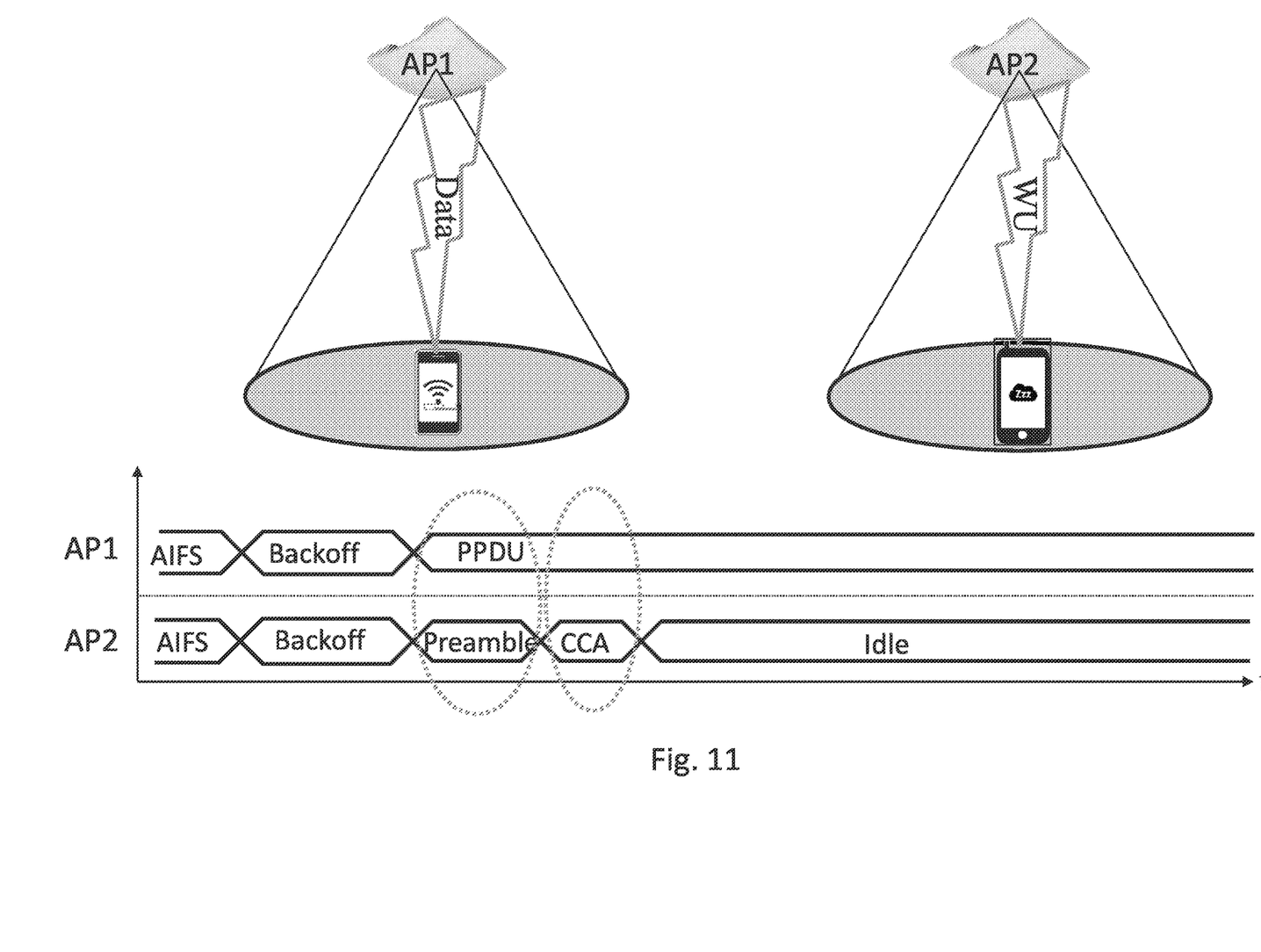
FIGS. 11 and 12 show examples of two alternative scenarios where collisions are detected and avoided according to an embodiment of the present invention.
Figure 12:
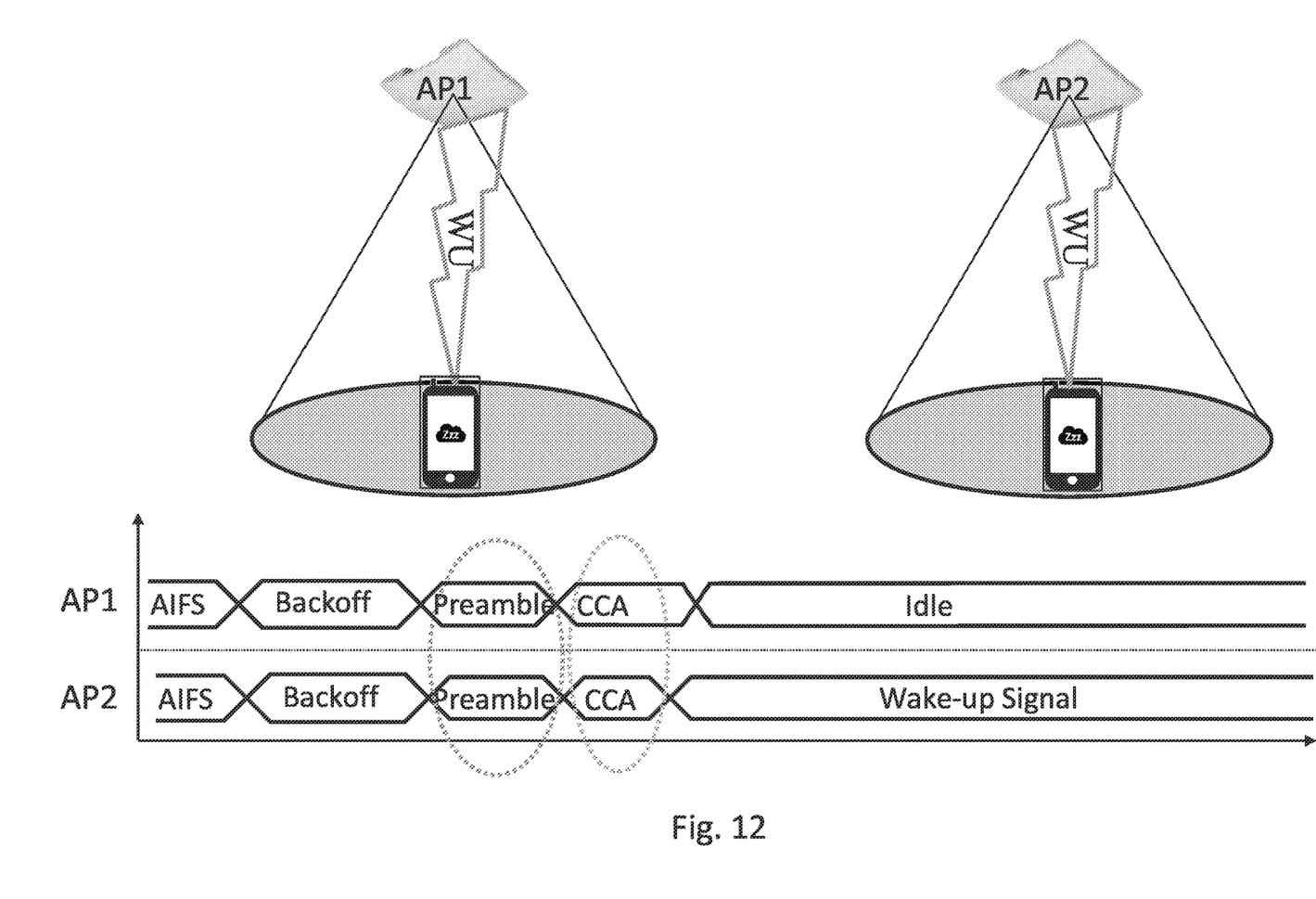

FIG. 11 and FIG. 12 show two alternative scenarios where collisions are detected and avoided according to an embodiment of the present invention.

As shown in FIG. 11, there are two access points: AP using normal Wi-Fi radio and AP2 using WUR. AP can send a Wi-Fi frame (e.g., a data frame, shown as PPDU in FIG. 11) via the Wi-Fi radio. AP2 can send a wake-up frame via WUR. At the same time, AP starts the transmission of the PPDU and AP2 starts the transmission of the preamble. A collision occurs between the two transmissions. According to an embodiment of the present invention, AP2 detects that the transmission medium is not free, which technically means that AP detects the collision. AP2 stops its transmission of the expected wake-up signal after the preamble. Therefore, AP can successfully continue its transmission of the PPDU and the collision is avoided.

As shown in FIG. 12, there are two access points: AP and AP2. AP and AP2 start a transmission of the preamble at the same time. A collision occurs between the two transmissions. According to an embodiment of the present invention, after transmitting the preamble, both AP and AP2 start to detect whether the transmission medium is free or not. The time period of AP2 is shorter than that of AP1. Therefore, AP2 continues successfully a transmission of the planned wake-up signal. AP1 detects during its time period that the transmission medium is not free because AP2 transmits its wake-up signal. AP2 defers its transmission of the wake-up signal and returns to idle. Therefore, a collision between two wake-up signals is avoided.

The invention has been described in conjunction with embodiments including a communication device such as an access point. However, other applications can be understood and effected by those skilled in the art in practicing the claimed invention, from a study of the drawings, the disclosure, and the appended claims.

The elements described as separate parts in the communication device 400 may or may not be physically separate. For example, the transmitter 403 and receiver 405 may be integrated in a transceiver. The detector 407 may be (partially) integrated with the transmitter 403 and/or the receiver 405.

A computer program may be stored or distributed on a suitable medium, such as an optical storage medium or a solid-state medium supplied together with or as part of other hardware, but may also be distributed in other forms, such as via the Internet or other wired or wireless telecommunication systems.

The invention claimed is:

1. A communication device, comprising:
   a processor configured to perform, during a time period, a determination of whether a transmission medium is free for communication; and
   a transmitter configured to transmit a wake-up preamble such that the time period starts after the preamble is transmitted by the transmitter, transmit a wake-up signal on the transmission medium if the transmission medium is free, and not transmit the wake-up signal on the transmission medium if the transmission medium is not free.

2. The communication device according to claim 1, further comprising:
   a detector configured to detect, during the time period, whether the transmission medium is free for communication;
   wherein the determination is based on the detection of the detector.

3. The communication device according to claim 1, further comprising:
   a receiver configured to receive a notification from another device; and
   wherein the determination is based on the notification.

4. The communication device according to claim 1, wherein
   the processor is further configured to switch the communication device to an idle mode if the transmission medium is not free.

5. The communication device according to claim 1, wherein a length of the time period is predefined in the communication device, or decided by the processor.

6. The communication device according to claim 5, wherein:
   the processor is further configured to randomly select a quantity of time slots to be included in the time period; and
   the length of the time period is decided by the processor based on how many time slots are selected.

7. The communication device according to claim 1, wherein: the length of the time period is decided by the processor based on at least one of a transmission mode (Tx)-receiving mode (Rx) switching time, a time for the detector to perform the detection, or an Rx-Tx switching time, the Tx-Rx switching time is a turn-round time for a switch from a transmission mode (Tx) to a receiving mode (Rx);
the Rx-Tx switching time Rx-Tx is a turn-round time for a switch from the receiving mode back to the transmission mode; and
the time period has a minimal time required by at least one of a switch from Tx to Rx or a switch from Rx to Tx.

8. The communication device according to claim 7, wherein the time period comprises the Tx-Rx switching time, a clear channel assessment (CCA) detection time, and the Rx-Tx switching time.

9. The communication device according to claim 1, wherein the communication device is an access point.

10. The communication device according to claim 1, wherein the wake-up preamble is at least one of an 802.11 legacy preamble or a clear to send (CTS) frame.

11. The communication device according to claim 1, wherein the processor adds a further time period to determine whether the transmission medium is free for communication if the determination during the time period is that the transmission medium is not free.

12. The communication device according to claim 1, wherein:
   the processor continuously performs the determination during an entirety of the time period while the determination is that the transmission is not free; and if at the end of the time period the determination is that the transmission medium is free, the transmitter transmits the wake-up signal on the transmission medium.

13. The communication device according to claim 1, wherein an upper limit of the time period is set according to a minimal free medium time that enables another device to start transmission on the transmission medium.

14. A communication method, comprising the steps:
   performing, by a communication device, during a time period, a determination of whether a transmission medium is free for communication; and
   transmitting, by the communication device, a wake-up signal on the transmission medium if the transmission medium is free, and not transmitting the wake-up signal, by the communication device, if the transmission medium is not free.

15. The communication method according to claim 14, further comprising:
   detecting, by the communication device during the time period, of whether the transmission medium is free for communication;
   wherein the determination is based on a result of the detecting.

16. The communication method according to claim 14, further comprising:
   switching the communication device to an idle mode if the transmission medium is not free.

17. The communication method according to claim 14, further comprising:
   transmitting on the transmission medium, by the communication device, a preamble; and
   wherein the time period starts after the preamble is transmitted.

18. The communication method according to claim 14, further comprising:
   obtaining, by the communication device, a predefined length of the time period, or
   deciding, by the communication device, a length of the time period.

19. A non-transitory computer program comprising a computer code for performing the method according to claim 14 when the computer program runs on a computer.

\* \* \* \* \*